Feb. 24, 1931.  A. G. ENOCK  1,794,005
BOTTLE CAPPING OR FILLING MACHINE
Filed April 24, 1928   6 Sheets-Sheet 1
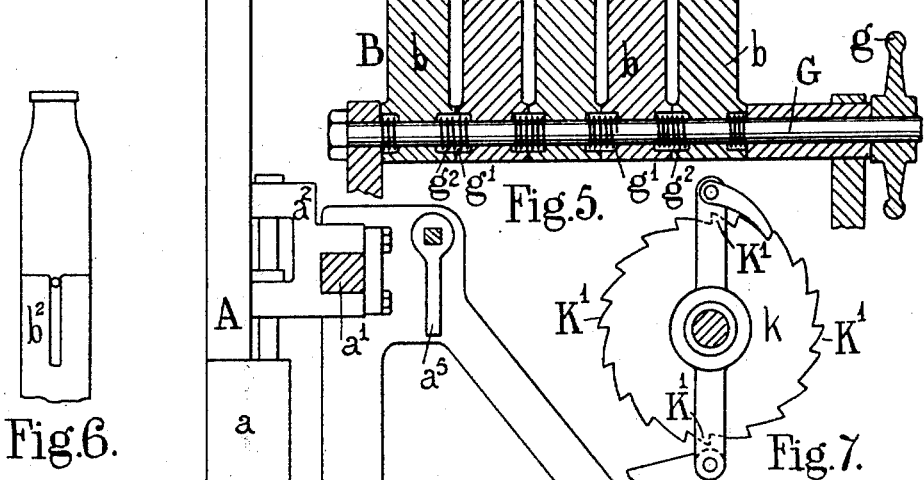
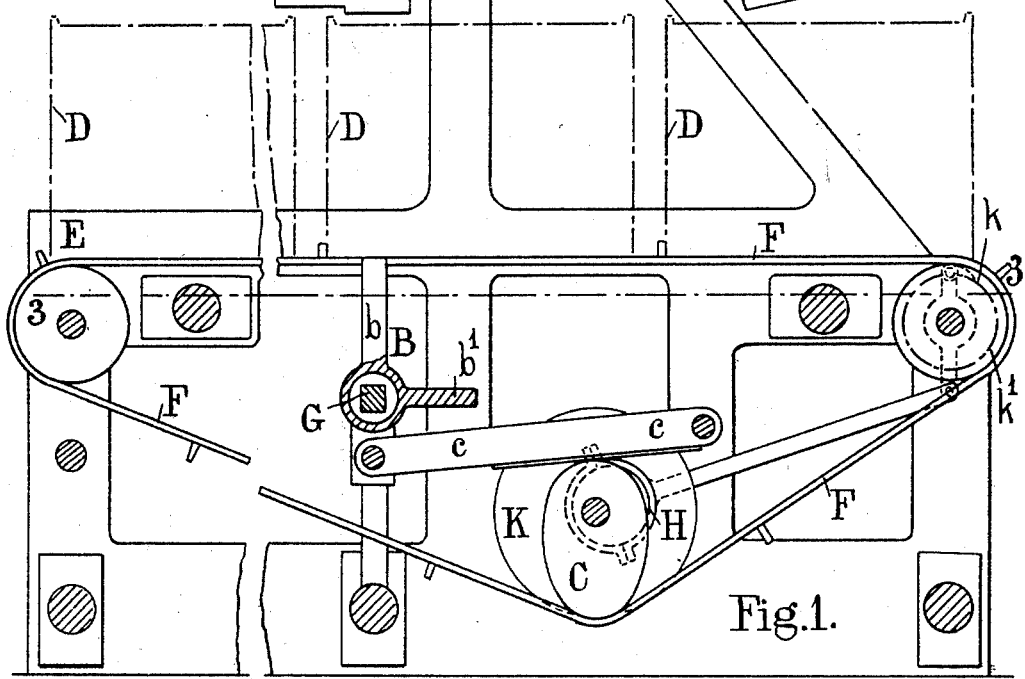
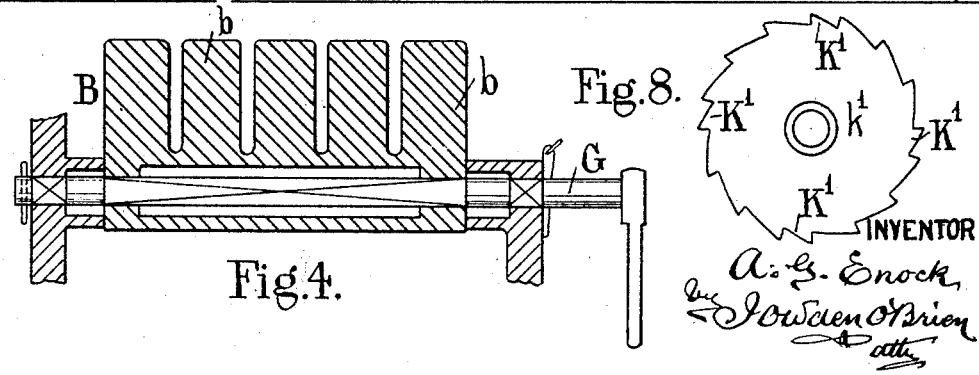

Feb. 24, 1931. A. G. ENOCK 1,794,005
BOTTLE CAPPING OR FILLING MACHINE
Filed April 24, 1928    6 Sheets-Sheet 3

INVENTOR
A. G. Enock

Feb. 24, 1931. A. G. ENOCK 1,794,005
BOTTLE CAPPING OR FILLING MACHINE
Filed April 24, 1928 6 Sheets-Sheet 4
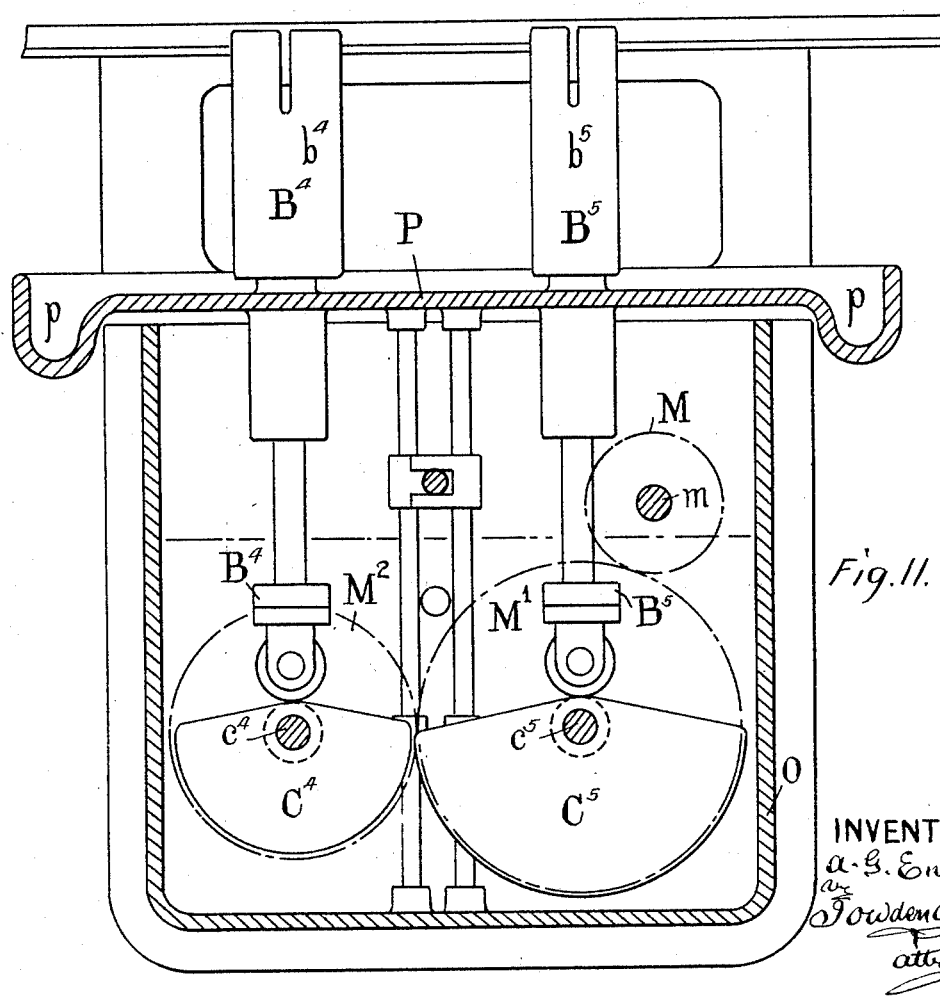
Fig. 11.
INVENTOR
a. G. Enock Feb. 24, 1931.  A. G. ENOCK  1,794,005
BOTTLE CAPPING OR FILLING MACHINE
Filed April 24, 1928  6 Sheets-Sheet 5

Patented Feb. 24, 1931

1,794,005

UNITED STATES PATENT OFFICE

ARTHUR GUY ENOCK, OF WEMBLEY PARK, ENGLAND, ASSIGNOR TO BURLECTAS LIMITED, OF LONDON, ENGLAND

BOTTLE CAPPING OR FILLING MACHINE

Application filed April 24, 1928, Serial No. 272,481, and in Great Britain May 16, 1927.

The invention relates to apparatus for applying discs or caps to the mouths of filled bottles and is particularly applicable to filling bottles in situ in crates in which the bottles therein are supported on and separated by cross wires of the type constructed with a number of disking heads or capping heads corresponding to a row of bottles or to the number of bottles in the crate, and a table by which the bottles are raised to bring the bottle mouths into contact with he disking or capping heads.

In known methods in operating on the crate of bottles the crate is lifted by its walls into which the cross wires are fixed, with the bottles standing upon the bottom wires and when the mouths of the bottles come into pressure contact with the disking or capping appliances there is usually some trouble because of the unsteadiness of the bottles and the deflection of the wires particularly in the central area of the crate. Further there is a liability to permanently bend the wires and to injure the walls of the crate where the wires pass through.

According to the invention the apparatus is constructed with the lifting member or lifting members below the disking or capping or filling heads capable of being raised and lowered, made in sections or pedestals which will pass up between and around the bottom wires of the crate and lift one row of bottles or all the bottles in a crate at a time independently of the crate, so that the whole crate is not lifted by the walls, and a uniform pressure is imparted to all the bottles against the operating heads and eliminating all tendency of bending or disturbing the bottom wires of the crate, with cam and lever mechanism to raise the table and means to space the operating heads to adjust them for different sizes of bottles.

The invention will be fully described and ascertained by reference to the drawings and the following further description of the operations:—

Fig. 1 is a longitudinal section elevation of one form of the invention.

Fig. 4 is a sectional detail of member B.

Fig. 5 is a sectional detail showing another construction of member B for raising bottles resting on two wires.

Fig. 6 is an elevation of bottle and one separate pedestal $b$ for raising bottles resting on one wire.

Figs. 7 and 8 are details of ratchet wheels.

Figs. 11 and 12 are side and front elevations (partly in section) showing another disposition of mechanism for operating the lifting members B and pedestals $b$.

Figure 2:
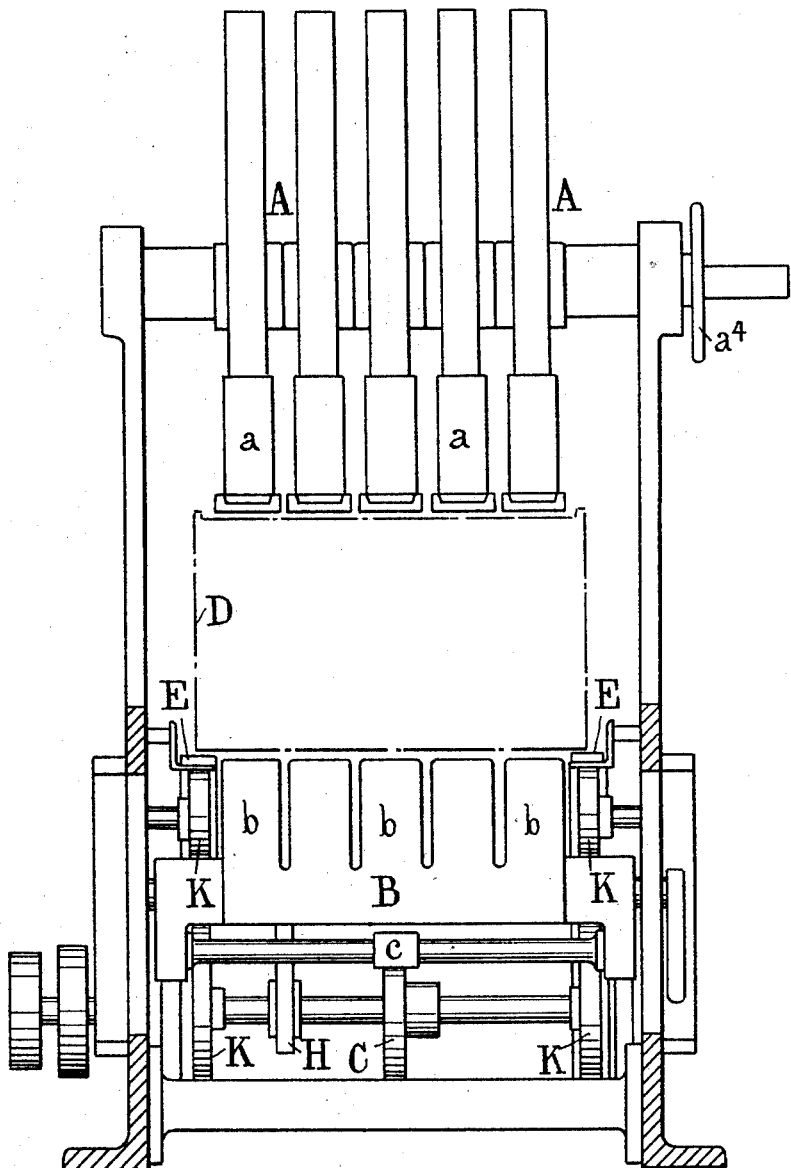
Fig. 2 is a front elevation.
Figure 3:
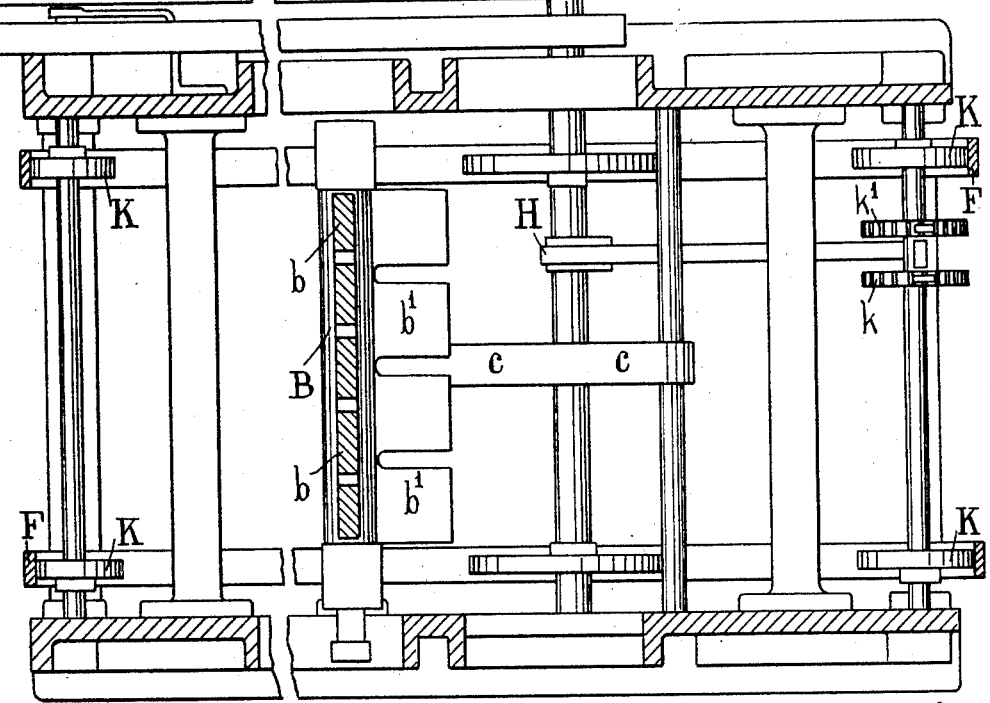
Fig. 3 is a sectional plan on line 3—3 Fig. 1.

The operating head A comprises a suitable frame which supports a number of disking or capping appliances or filling nozzles the heads being of known construction.

The machine is constructed with the operating head A fixed upon a suitable framing, and below it a lifting member B or members $B^1$, $B^2$ adapted to be raised and lowered by a cam C or cams $C^1$ $C^2$ to bring the mouths of the bottles into contact with the individual disking or capping punches or filling nozzles.

The lifting members B or lifting members $B^1$, $B^2$ are constructed of a number of pedestals $b$ which pass between or embrace the bottom wires of the crate D and directly contact with and raise the bottles each individually preferably a row at a time partly out of the crate without lifting or disturbing the crate to the disking or capping heads of the filling nozzles above.

An angle iron roller-runway or path E mounted on the frame is fitted below the operating head A to receive the crates D and may extend beyond one or both ends of the machine. A lug chain conveyor F travelling along the path or runway E pushes the crates D along intermittently under the operating head A the distance or space of one row of bottles at a time.

In working a continuous row of crates moved by a lug chain F it becomes necessary to provide a space between the contiguous ends or sides of the crates D into which the pedestals $b$ may rise as the crates pass over. Any unequal spacing of the bottles along the track is provided for by varying the forward step by a tooth $K^1$ recurring at equal intervals of a greater or less pitch than the other teeth.

Referring to Figs. 1 to 6 the lifting member B is mounted upon a bar G, capable of rotation and formed with two sets of sections or pedestals $b$ and $b^1$ arranged in angular relationship and of different lengths to raise bottles of different sizes to the same level. The set $b^1$ of sections or pedestals are brought into operative position by rotating the bar G upon which the lifting member B is mounted. The set of sections or pedestals $b$ are spaced at different distances to the set $b^1$ so that bottles of varying diameters and standing at different centres may be raised.

The pedestals $b$, $b^1$ of the lifting member B may be integral with the bar G or keyed thereon as in Fig. 4. Or each section or pedestal may be separately mounted thereon and clamped in position by a hand nut $g$ as in Fig. 5. The pedestals $b$ may be recessed at $g^1$ and springs $g^2$ placed between them, the springs providing automatic spacing of the pedestals when the clamping nut $g$ is released.

As applied to a disking machine the disking punches $a$ may be held by their brackets $a^2$ on a square bar $a^1$ and clamped by hand wheel $a^4$. On changing over to disk larger bottles the wheel $a^4$ is released and spacing pieces $a^5$ placed between the brackets $a^2$ and the hand wheel $a^4$ clamped up again. The disking or capping punches $a$ may be of the well known slide fed type which is enabled to operate by the bottle mouth being raised above the crate, by the pedestal $b$ or $b^1$. They may be spaced at different centres for bottles of various diameters by intervening springs, or stops $a^5$ and a screw clamp $a^4$.

The construction of lifting member B and pedestals $b$ shown (Figs. 4 and 5) is designed for use with bottle crates supporting the bottles on two or more bottom wires. For use with crates supporting the bottles on one wire or bar the pedestal $b^2$ may be slotted to allow space for the wire as the pedestal rises (see Fig. 6).

In all the arrangements described the chain conveyor F by which the crates and bottles are pushed forward to move them over the pedestal or pedestals is moved intermittently by an eccentric H and ratchet wheels $k$, $k^1$ and pawls in successive steps equal to approximately the width of a bottle. The chains F pass over a driving sprocket K driven by the ratchet wheels $k$ or $k^1$ one of the pawls only being in engagement therewith at a time. The ratchet wheels $k$, $k^1$ shown enlarged in Figs. 7 and 8 are moved forward one tooth at each revolution of the eccentric H to carry forward the crates a distance equal to the width of a bottle.

As each row of bottles stops beneath the disking or capping punch, the pedestals $b$ of the lifting member B are raised by the cam C and lever $c$ and raise each bottle partly out of the crate until the mouth is pressed into a disking punch. When the bottles are lowered the lug chain F moves the crate another step, and so on until the crate reaches the inspection position from which position the crate according to circumstances is removed or carried forward.

Figures 9, 10:
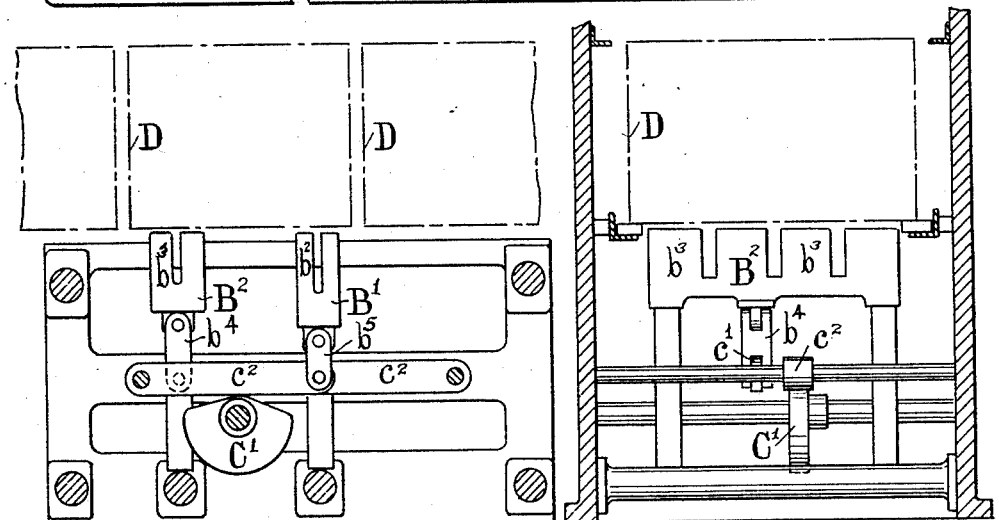
Figs. 9 and 10 are side and front elevations (partly in section) showing a modification of the lifting members B and pedestals $b$.

Referring to Figs. 9 and 10 the bottle lifting mechanism is constructed with two separate lifting members $B^1$, $B^2$ with pedestals $b^2$ $b^3$ for different sizes of bottles each provided with separate work heads. The lifting members are raised as required by a single cam $C^1$ engaging alternately a lever $c^2$ coupled by a link $b^5$ to the lifting member $B^1$ and a lever $c^1$ coupled by a link $b^4$ to the lifting member $B^2$.

The cam $C^1$ is keyed on its shaft but free to slide thereon when moved by a hand lever (not shown) to bring it beneath one or other of the levers $c^1$, $c^2$. The levers $c^2$, $c^1$ for operating the lifting members $B^1$, $B^2$ are pivoted at one end and are of different lengths to provide a smaller or greater lift for larger and smaller bottles respectively.

Figure 12:
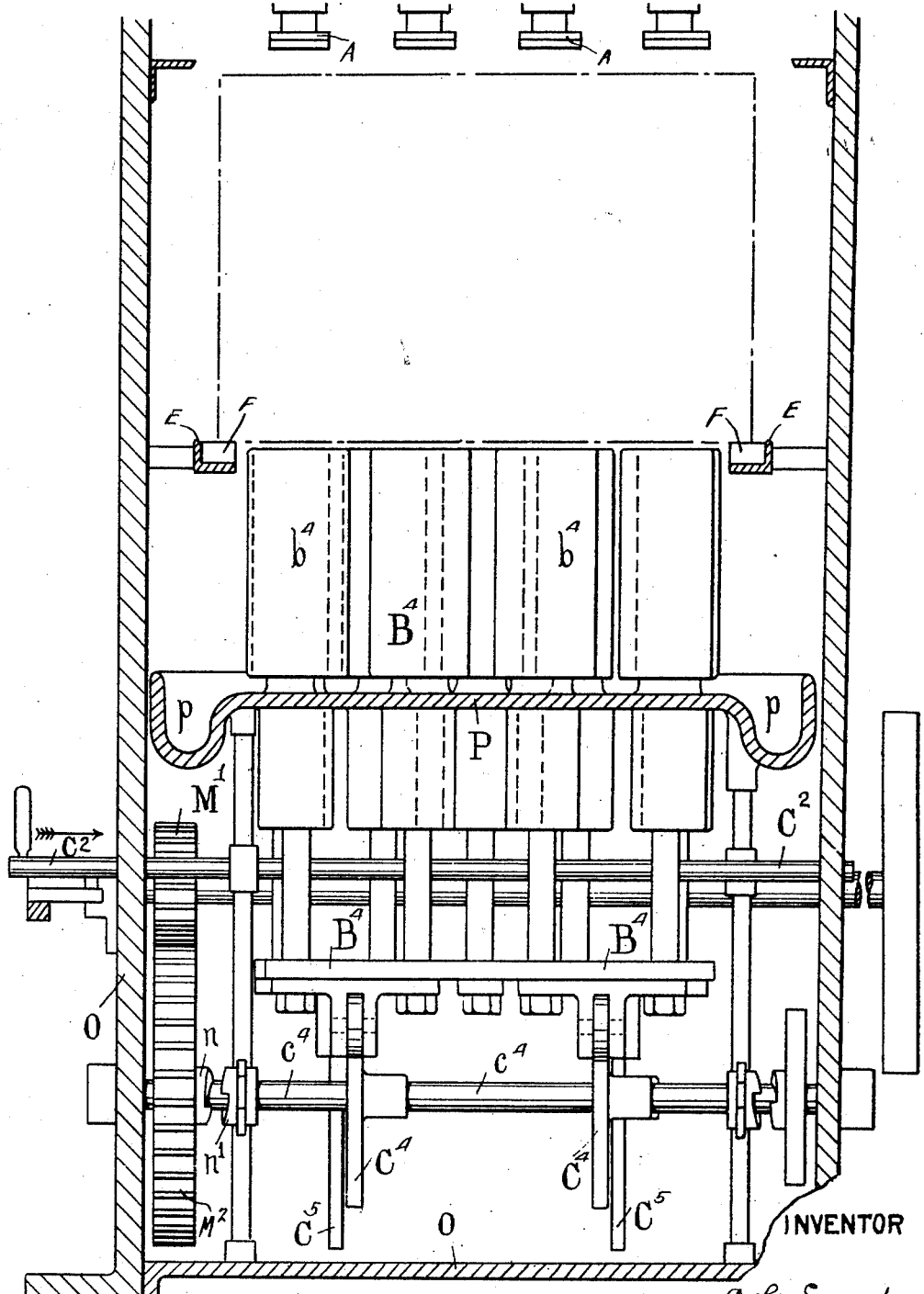

Referring to Figs. 11 and 12 in which the invention is shown as applied to a bottle filling machine, the bottle lifting mechanism is constructed with two separate lifting members $B^4$, $B^5$ each provided with separate filling heads and with pedestals $b^4$, $b^5$ for different sizes of bottles raised by two pairs of cams $C^4$, $C^5$ rotated alternately from a driving pinion M on the driving shaft $m$. The cams $C^4$ on the shaft $c^4$ have a shorter lift than the cams $C^5$ on the cam shaft $c^5$. The pinion M gears with a pinion $M^1$ loose on the cam shaft $c^5$ and is fitted with one member of a dog clutch the other clutch member being keyed to slide on the cam shaft $c^5$. Similarly a pinion $M^2$ meshing with $M^1$ is fitted with a dog clutch $n$ the other member $n^1$ being keyed to slide on the cam shaft $c^4$. By moving the rod $C^2$ in the direction of the arrow the clutch members $n$, $n^1$ are engaged to rotate the shaft $c^4$, cam $C^4$ and raise the lifting member $B^4$ and pedestals $b^4$ to raise the larger bottles and by moving the rod $C^2$ in the opposite direction the cam shaft $c^5$ and cam $C^5$ are rotated to raise the lifting member B⁵ and pedestals $b^5$. The shafts and cams rotate in a framing or casing O which forms an oil bath and is covered by a catch plate or drip plate P to catch any spurts or splashes of milk and prevent milk entering the oil bath. The spindles of the pedestals $b^4$ $b^5$ pass through the plate P which is formed with bosses on the upper side and the pedestals are recessed to fit over the bosses which project upwards inside to prevent any milk flowing through similar to that shown in Fig. 13. The catch plate P is made with a drain channel or gutter $p$ at the sides to collect and drain away any splashes and drips of milk.

Figure 13:
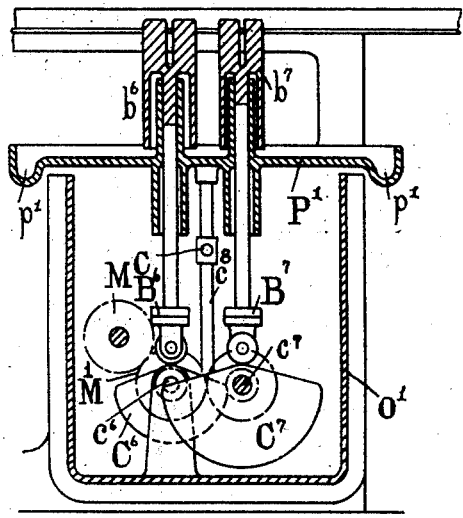
Figs. 13 and 14 are side and front elevations (partly in section) showing another arrangement of mechanism for operating the lifting members B and pedestals $b$.
Figure 14:
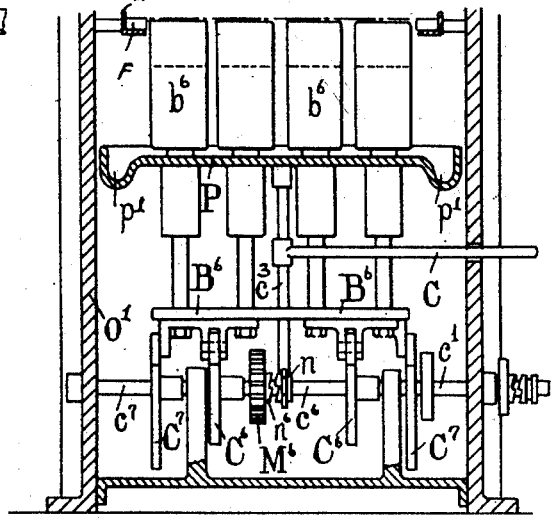

Referring to Figs. 13 and 14 in which the invention is shown as applied to a bottle filling machine, the lifting mechanism is constructed with two separate members or bars $B^6$ and $B^7$ each provided with a separate filling head for different sizes of bottles, the members $B^6$ and $B^7$ being raised by two pairs of cams $C^6$, $C^7$ on the cam shafts $c^6$, $c^7$ the cams $C^6$ having a shorter lift than the cam $C^7$. A continuously driven pinion $M^6$ loose on the cam shaft $c^6$ is formed with one member $n^6$ of a clutch the other member $n^7$ being keyed to slide on the shaft. A similar pinion and clutch (not shown) are mounted on the cam shaft $c^7$. By rotating the shaft $C^8$ by the bar $C^9$ in one direction the cam shaft $c^6$ and cam $C^6$ are set in motion to raise one lifting member and set of pedestals, and by rotating the shaft $C^8$ in the other direction the cam shaft $c^7$ and the cam $C^7$ are set in motion to raise the other member and set of pedestals. The moving parts rotate in a framing or casing $O^1$ forming an oil bath and are covered by a drip plate or catch plate $P^1$ with a drain channel or gutter $p^1$ at the sides. The catch plate P is formed with bosses on the upper side and the pedestals are recessed to fit over them to prevent drips or splashes of milk flowing through to the oil bath (see Fig. 13).

Figure 15:
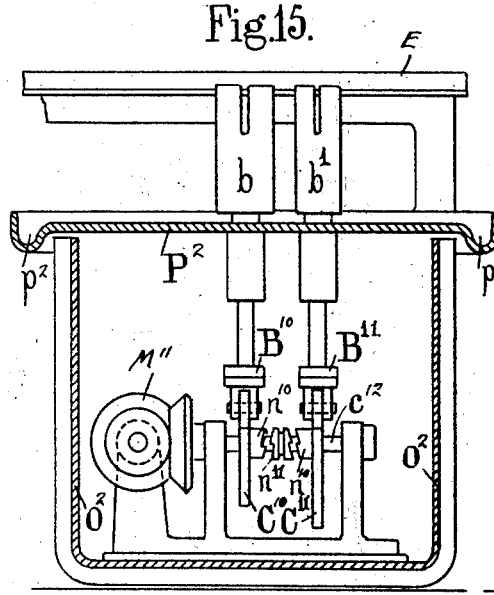
Figs. 15 and 16 are side and front elevations (partly in section) showing a further modification of mechanism for operating the lifting members B and pedestals $b$.
Figure 16:
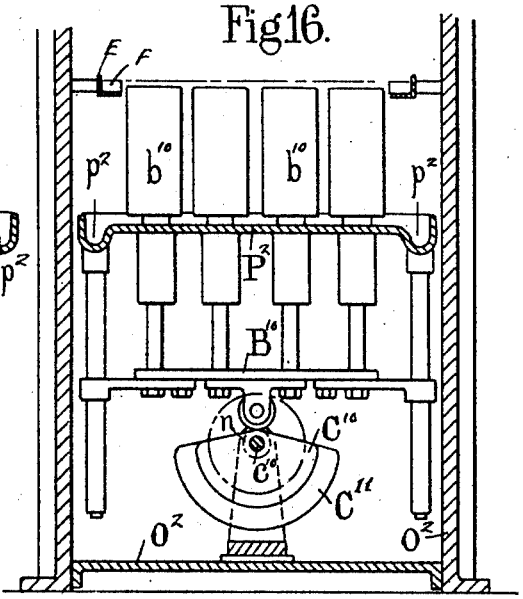

Referring to Figs. 15 and 16 in which the invention is shown as applied to a bottle filling machine, the lifting mechanism is constructed with two separate members for different sizes of bottles raised by two cams $C^{10}$, $C^{11}$ on the same cam shaft $c^{12}$ and is provided with a separate filling head for each member. The cams are loose on the shaft and are each fitted with one member $n^{10}$ of a dog clutch, and the corresponding member $n^{11}$ is keyed to slide on the shaft and may be brought into engagement with either cam as required to raise the lifting member $B^{10}$ and pedestals $b^{10}$ or the member $B^{11}$ and pedestals $b^{11}$. The cam shaft $c^{10}$ and clutch member $n^{11}$ are driven by bevel gears $m^{11}$ in constant mesh.

The framing or casing $O^2$ forms an oil bath for the moving parts covered by a drip plate or catch plate $P^2$ with a drain channel or gutter $p^2$ at the sides. The catch plate $P^2$ is formed with bosses on the upper side and the pedestals are recessed to fit over them to prevent drips or splashes of milk flowing through to the oil bath.

What I claim as my invention and desire to protect by Letters Patent is:—

1. In a machine for disking, capping or filling bottles in wire bottomed crates, the combination of a stationary operating head, a set of slotted pedestals mounted to raise the bottles, a further set of slotted pedestals arranged adjacent thereto but having a different lift from the first set, vertical spindles upon which the pedestals are mounted, a lifting member below each line of spindles upon which the lower ends of the spindles rest and a cam for raising each lifting member.

2. In a machine for disking, capping or filling bottles in wire bottomed crates the combination of a stationary operating head, a set of slotted pedestals mounted to raise the bottles, a further set of slotted pedestals arranged adjacent thereto but having a different lift from the first set, vertical spindles upon which the pedestals are mounted, a lifting member below each line of spindles upon which the lower ends of the spindles rest, a cam for raising each lifting member, gearing through which the cams are driven and a clutch to disengage the cams from the gearing.

3. In a machine for disking, capping or filling bottles in wire bottomed crates the combination of a stationary operating head, a set of slotted pedestals mounted to raise the bottles, a further set of slotted pedestals arranged adjacent thereto but having a different lift from the first set, vertical spindles upon which the pedestals are mounted, a lifting member below each line of spindles upon which the lower ends of the spindles rest, a cam for raising each lifting member, gearing through which the cams are driven and a clutch to disengage the cams from the gearing, a drip plate arranged below the pedestals to catch any overflowing liquid and bosses on the drip plate entering recesses in the pedestals to prevent such liquid from coming into contact with the gearing.

4. In a machine for disking, capping or filling bottles in wire bottomed crates the combination of a stationary operating head, a set of slotted pedestals mounted to raise the bottles, a further set of slotted pedestals arranged adjacent thereto but having a different lift from the first set to raise bottles of different sizes to the same level, vertical spindles upon which the pedestals are mounted, a lifting member to raise the pedestals and a cam for raising the lifting member, a runway below the head upon which the crates rest, lug chain conveyors to traverse the crates along the runway and mechanism to give the conveyors an intermittent movement the width of one bottle.

5. In a machine for disking, capping or filling bottles in wire bottomed crates the combination of a stationary operating head, a plurality of slotted pedestals mounted to raise the bottles, vertical spindles upon which the pedestals are mounted, a lifting member to raise the pedestals and a cam for raising the lifting member, a runway below the head upon which the crates rest, lug chain conveyors to traverse the crates along the runway, pulleys over which the chain passes, mechanism to give the conveyors an intermittent movement the width of one bottle and mechanism synchronized therewith to operat the cam.

In testimony whereof I have hereunto set my hand.

ARTHUR GUY ENOCK.